3,792,103
PROCESSES FOR THE DEHYDROGENATION OF ORGANIC FEEDSTOCKS

Darrell W. Walker, Bartlesville, Okla., assignor to Phillips Petroleum Company
No Drawing. Continuation-in-part of application Ser. No. 140,968, May 6, 1971. This application Mar. 7, 1972, Ser. No. 232,532
Int. Cl. C07c 5/18
U.S. Cl. 260—680 E    5 Claims

ABSTRACT OF THE DISCLOSURE

Organic compounds are dehydrogenated in the presence of molecular oxygen with a catalyst containing at least one of the elements nickel, cobalt or iron in association with tin, phosphorus, and at least one of arsenic, antimony or bismuth together with sufficient combined oxygen to satisfy the valence requirements of the components of the catalyst. Optionally, the catalytic compositions can contain minor amounts of alkali metal such as potassium. Representative of such conversions is the oxidative dehydrogenation of butane to butenes and butadiene. The conversion products are valuable compounds particularly useful as intermediates for the preparation of polymeric materials such as synthetic rubbers and the like.

---

This application is a continuation-in-part of application Ser. No. 140,968, filed May 6, 1971.

The present invention relates to chemical compositions. More particularly, the invention relates to catalyst compositions, their preparation and the catalytic processes employing such compositions, e.g., processes for effecting the dehydrogenation of organic feedstocks.

Thermal noncatalytic and catalytic processes for converting organic compounds to compounds having a higher degree of unsaturation are known. The former are characterized by undesirable side reactions, low order of conversion and yields and poor selectivity to desired product. The catalytic processes are characterized by the particular catalytic material employed and the conditions under which the processes are operated, e.g., in the absence or presence of oxygen. While a number of such catalytic processes have attained some measure of commercial success, there is a continuing search for better catalytic materials which exhibit the high activity, high yield to desired product, high selectivity to desired product, extended longevity, high response to regeneration, especially in the presence of air, and which keep undesirable side reactions to a minimum; all characteristics of good dehydrogenation catalysts. The vexatious problem as constantly faced by those skilled in the art is the identification and characterization of the compositions which are highly efficient dehydrogenation catalysts.

Among the more recently disclosed oxidative dehydrogenation catalysts are those which include halogens or halogen-releasing materials. Such catalysts exhibit many disadvantages in regard to equipment corrosion and expense of continuously feeding, recovery and recycling of the relatively expensive halogen materials. Halogen-free catalytic materials continue to be the most desirable for use in dehydrogenation processes.

The present invention provides a novel catalyst and a novel process for the conversion of organic feedstocks to compounds having a higher degree of unsaturation and which have the same or lower number of carbon atoms as the organic feed. According to this invention, an organic feedstock, such as a hydrocarbon feedstock, can be converted directly to compounds having a greater degree of unsaturation by contacting said feedstock under dehydrogenation conditions in the vapor phase in the presence of molecular oxygen with a calcined catalytic material comprising: at least one metal selected from the group consisting of nickel, iron, or cobalt; tin; phosphorus; at least one of arsenic, antimony or bismuth; and combined oxygen. Optionally, such catalysts can include minor amounts of alkali metal compound. Thus, for example, paraffinic hydrocarbons can be converted in good yields to monoolefins and diolefins, and monoolefins can be converted to diolefins. The invention is particularly applicable for the production of diolefins from paraffins and particularly useful results are obtained by the dehydrogenation of butanes to butenes and butadiene.

The organic feedstocks which are applicable for the oxidative dehydrogenation processes of the present invention comprise dehydrogenatable organic compounds having from about 2 to about 12 carbon atoms per molecule and at least one

grouping, i.e., adjacent carbon atoms having at least one hydrogen atom on each carbon atom. Particularly suitable feedstocks include aliphatic hydrocarbons having from about 2 to about 12 carbon atoms per molecule. Such hydrocarbons can be branched or unbranched and include paraffins as well as monoolefins. Particularly preferred are acyclic paraffins and monoolefins having 4 to 12 carbon atoms. The conversion of butane to butenes and butadiene, isopentane to isoamylenes and isoprene, and butenes to butadiene is presently considerd most advantageous. Some specific examples of other feeds include isobutane, pentane, hexane, 2-methylhexane, octane, 2,4-dimethyloctane, 2-methylbutene-1, hexene-2, octene-1, 3-methylnonene-4, dodecene-1, and the like, including mixtures thereof.

The catalysts of the present invention comprise: at least one of nickel, cobalt or iron; tin; phosphorus; at least one of arsenic, antimony or bismuth; combined oxygen; and, optionally, at least one alkali metal or alkali metal compound. For simplicity, the nickel, cobalt and iron group is referred to as the ferrous metals of Group VIII, or merely as the ferrous metals. The elements contained in the catalysts of the invention are not necessarily in the elemental state but can be combined with sufficient oxygen to form one or more neutral compounds such as nickel stannate, cobalt phosphate, iron stannate, nickel oxide, iron oxide, nickel arsenate, bismuth stannate, antimony oxide, etc., depending upon the proportions of the elements present. It is presently preferred that a catalyst of the present invention contain each of the above-mentioned elements in amounts shown in the following table:

| Element | Weight percent Broad | Weight percent Preferred |
|---|---|---|
| Ferrous metal | 20–75 | 30–50 |
| Tin | 1–50 | 14–35 |
| Phosphorus | 0.5–10 | 2–6 |
| Arsenic, antimony or bismuth | 1–10 | 1–5 |
| Alkai metal | 0–6 | 1–4 |

The percentages shown above are based upon a total weight of the finished catalyst, and the difference between the total of the weights of the above-named elements and 100 percent is made up by its oxygen content in amounts sufficient to satisfy the valences of each of the elements in the catalyst. Because of their greater effectiveness, nickel is the preferred ferrous metal, and arsenic and antimony are preferred over bismuth.

These catalysts can also be supported on, or diluted with, conventional catalytic materials such as silica, alumina, boria, magnesia, titania, zirconia, and combinations thereof, as well as other similar conventional materials known in the art.

The catalysts of the present invention can be prepared by any suitable method. Conventional methods such as co-precipitation, impregnation, or dry mixing can be used. In general, any method can be used which will provide a composition containing the above-described elements in the above-described portions and which will have a catalytic surface area of at least about 1 square meter per gram. Thus, a ferrous metal compound, a tin compound, a phosphorus compound, and an arsenic, antimony or bismuth compound can be combined in any suitable way and in any order.

In one preferred method of preparation, a solution of a ferrous metal compound, such as nickel nitrate, and a solution of a tin compound, such as potassium stannate, are coprecipitated by the addition of a potassium hydroxide solution. The resulting precipitate is suitably washed, treated with a phosphorus compound, such as phosphoric acid, dried and calcined. The arsenic, antimony or bismuth is then incorporated into the catalyst by impregnation with a compound containing such element such as arsenic acid, antimony chloride or bismuth nitrate.

In one alternative method of preparation, the phosphorus component can be introduced into the composition during the initial coprecipitation stage. It is generally preferred that the alkali metal (if added) be introduced at or prior to the ferrous metal compound-tin compound coprecipitation. It is also preferred that the arsenic, antimony or bismuth component be added after the phosphorus component has already been incorporated. A final impregnation with arsenic, antimony or bismuth, particularly after the solid catalyst is in the desired size and shape, is particularly effective and convenient.

Substantially any ferrous metal, tin, phosphorus, arsenic, antimony, bismuth, and alkali metal compound can be employed in the preparation of the catalyst so long as none of the compounds are detrimental to the final oxidative dehydrogenation catalyst and so long as elements, other than ferrous metal, tin, phosphorus, arsenic, antimony, bismuth, alkali metal and oxygen, in the compounds used, are substantially removed from the final catalyst composition by prior washing or by volatilization. In some instances, however, small amounts of some other elements, which are involved in the preparation of the catalyst, can be tolerated in the final catalytic composition. For example, if a sulfate such as nickel sulfate or tin sulfate is employed in the preparation, small residual amounts of sulfur can be tolerated. Halogen residues, on the other hand, are less desirable in the catalyst.

Generally, the preferred ferrous metal, tin, phosphorus, arsenic, antimony or bismuth, and alkali metal compounds are either the oxides of these elements or compounds which are readily convertible to the oxide on calcination. Some examples of these are nickel nitrate, cobalt acetate, phosphoric acid, ferric nitrate, nickel stannate, potassium stannate, nickel stannate, stannic chloride, stannous oxalate, arsenic acid, potassium hydroxide, rubidium nitrate, sodium carbonate, sodium arsenate, lithium phosphate, cesium tartrate, antimony oxide, bismuth oxide, bismuth phosphate, and the like, including mixtures thereof.

Regardless of the specific sequence of steps utilized in the catalyst preparation method, the last stage of the preparation is activation by calcination in an oxygen-containing gas such as air at a temperature of 900 to 1800° F. for 1 to 24 hours, or until the catalyst is active for oxidative dehydrogenation. The solid catalyst compositions can be conveniently formed and utilized in any conventional shape or form such as tablets, extrudates, granules, powder, agglomerates, and the like.

The dehydrogenatable hydrocarbon feedstocks are converted according to the process of the present invention at temperatures in the range of from about 800 to about 1300° F., preferably from about 950 to about 1200° F.; at any convenient pressure such as from about 7 to about 250 p.s.i.a.; and at a volumetric hydrocarbon:oxygen ratio of about 1:0.1 to about 1:4. The presence of steam is frequently beneficial and volumetric steam:hydrocarbon ratios up to 50:1 can be used. The hydrocarbon feed rate will generally be in the range of from about 50 to about 5,000 GHSV (gas hourly space velocity). The fixed catalyst bed is the preferred mode of contact, but other modes, such as a fluidized bed, can also be used.

The dehydrogenation process is ordinarily carried out by forming a mixture, preferably a preheated mixture, of a hydrocarbon feed, the oxygen-containing gas, and the steam (if used) and passing this mixture over the catalyst at the desired temperature. The effluent from the reaction zone is subjected to any suitable separation method to isolate and recover the desired product. Unconverted feeds or partially converted materials can be recycled.

The catalysts of the present invention can be utilized for long periods of time without regeneration. However, when regeneration becomes necessary, this can be simply accomplished by merely cutting off the flow of the dehydrogenatable feedstock and allowing the catalyst to be contacted with oxygen and steam for a sufficient period of time to restore substantial activity to the catalyst.

Generally, at least trace amounts of oxygenated products, other than carbon oxides and water, are also formed in these reactions. For example, compounds such as furan, acetaldehyde, furfural, and acetic acid and the like can be obtained. Some carbon oxides will be formed as well as some cracking products. In some instances, butadiene can be formed as a by-product for oxidative dehydrogenation of isopentane to isoprene.

The invention can be illustrated by the following examples.

EXAMPLE I

Preparation of catalysts

Preparation of Ni/Sn/P/As/O invention catalyst: 1160 g. of $NiNO_3 \cdot 6H_2O$, 400 g. $K_2SnO_3 \cdot 3H_2O$, and 289 g. 85% KOH were each dissolved in water. The three solutions were then added, simultaneously and dropwise, into a stirred container of water while maintaining the pH in the range 8–9. The resulting wet gel was filtered, and washed sufficiently with distilled water to reduce the potassium content to the desired level. The wet gel was then intimately mixed with an aqueous solution containing 62 g. of $H_3PO_4$ (85 percent). The mixture was then dried at 220° F., calcined at 1100° F. for 3 hours, then crushed to a 20–40 mesh screen size. The Ni/Sn/P/O composition contained 42% Ni, 27% Sn, 3.1% P, and 0.63% K, by weight. It had a Ni:Sn atomic ratio of about 3:1 and a surface area of 155 m.$^2$/g.

A 5 g. portion of the above-prepared Ni/Sn/P/O composition was then impregnated with arsenic by contact with 10 cc. of an aqueous solution containing 0.236 g. $H_3AsO_4$. The impregnated solid catalyst was then dried at 220° F. and calcined at 1100° F. for 3 hours. It contained about 2.5 weight percent As.

Another 5 g. portion of the above-prepared Ni/Sn/P/O composition was similarly impregnated but with only 0.047 g. $H_3AsO_4$. The finished catalyst contained about 0.5 weight percent As.

Preparation of Ni/Sn/As/O control catalyst: 80 g. of $K_2SnO_3 \cdot 3H_2O$, 232 g. $NiNO_3 \cdot 6H_2O$, and 59 g. KOH (85 percent) were each dissolved in water. The three solutions were then added, simultaneously and dropwise, to a stirred container of water while maintaining the pH at about 7–9. The wet gel was filtered and washed. One-fourth of the wet gel was intimately mixed with 2.2 g. of $H_3AsO_4$ in 35 cc. water, then dried at 220° F., calcined at 1100° F. for 3 hours, crushed and screened to 20–40 mesh. The catalyst contained 42% Ni, 26% Sn, 2% K, and 4.4% As. The Ni:Sn atomic ratio was about 3:1.

EXAMPLE II

Oxidative dehydrogenation of butane

Each of the four catalysts prepared above was used in the oxidative dehydrogenation of butane in separate runs. The runs were carried out in a fixed bed reactor at 1100° F. and at atmospheric pressure. The space rates for the butane, air, and steam were 500, 2,500 and 5,000 GHSV, respectively. The effluent streams were samples after 12 hours on-stream and analyzed. The results of these runs with each of these catalysts are shown in Table I.

0.9 wt. percent potassium, and had a surface area of 135 m.$^2$/g. The analysis of the antimony-containing invention catalyst was similar except that it also contained 5.3 wt. percent antimony and had a surface area of 66 m.$^2$/g.

The above-prepared catalysts were tested for oxidative dehydrogenation of butane in several runs at 1075° F. and at atmospheric pressure. The butane rate was 500 GHSV and the oxygen:butane:steam volumetric ratios were 1.2:1.0:15. After 12 hours on-stream, the reaction effluent was sampled and analyzed by gas-liquid chroma-

TABLE I.—OXIDATIVE DEHYDROGENATION OF BUTANE

|  | Run 1 | Run 2 | Run 3 | Run 4 |
|---|---|---|---|---|
| Catalyst | Ni/Sn/P/As/O | Ni/Sn/P/As/O | Ni/Sn/P/O | Ni/Sn/As/O |
| Ni:Sn atomic ratio | 3:1 | 3:1 | 3:1 | 3:1 |
| K, wt. percent | 0.63 | 0.63 | 0.63 | 2 |
| P, wt. percent | 3 | 3 | 3 | 0 |
| As, wt. percent | 2.5 | 0.5 | 0 | 4.4 |
| Conversion, percent | 47.9 | 45.3 | 39.3 | 31 |
| Yields:[1] |  |  |  |  |
| Butadiene | 20.7 | 20.9 | 19.0 | 11.5 |
| Butenes | 12.2 | 8.3 | 5.5 | 5.1 |
| Butadiene and butenes | 32.9 | 29.2 | 24.5 | 16.6 |
| Cracked products | 6.3 | 5.8 | 4.7 | 4.1 |
| Carbon oxides | 8.7 | 10.3 | 10.1 | 10.0 |
| Modivity:[2] |  |  |  |  |
| To butadiene | 43.2 | 46.2 | 46.8 | 37 |
| To butadiene and butenes | 68.7 | 64.4 | 62.1 | 54 |

[1] In moles per 100 moles butene fed into the reaction zone.
[2] Modivity is a simplified selectivity based on analysis of gas phase products for converted hydrocarbons, oxides of carbon and unconverted feed. As used herein, conversion and yield are reported on same basis as modivity. The units are moles of product per 100 moles butane converted.

The data in Table I show that the invention catalysts in invention Runs 1 and 2 provide superior results in the oxidative dehydrogenation of butane when compared to the closely related control catalysts of Run 3 and Run 4. Comparing the results of Run 1 with Run 3 shows that the addition of arsenic to the Ni/Sn/P/O catalyst increased the conversion from about 39 to about 48 percent with no increase in combined cracked and oxidized products. The bulk of the increased conversion went to butenes production.

Comparing invention Runs 1 and 2 with control Runs 3 and 4 shows that, to obtain the benefits of the improved catalyst composition, both phosphorus and arsenic must be present; leaving out either of these produces inferior results.

EXAMPLE III

Preparation of Ni/Sn/P/Sb/O catalyst: 56.5 g. of K$_2$SnO$_3$·3H$_2$O were dissolved in sufficient distilled water to make 300 cc. Similarly, 277.0 g. of Ni(NO$_3$)$_2$·6H$_2$O were dissolved in sufficient distilled water to make 600 cc., and 87.0 g. of 85% KOH were dissolved in sufficient distilled water to make 217 cc. The three solutions were then slowly and simultaneously added, dropwise, into a stirred container of 600 cc. distilled water while maintaining a pH range of 7.8–8.7. The final pH was 8.7. The resulting precipitate was filtered and washed with sufficient distilled water to give the desired residual potassium level.

The wet gel was divided into two equal portions. One portion was treated with 35 cc. of a solution containing 8 g. of 85% H$_3$PO$_4$. The other portion of the wet gel was treated with the same amount of phosphoric acid and also with 25 cc. of a SbCl$_3$ solution which contained 0.120 g. Sb/cc.

Both portions of the wet gel were dried overnight in a 120° C. forced draft oven. The dried material was then calcined in a furnace at 1100° F. for three hours. The calcined material was then ground and screened to a 20–40 mesh size. For still further comparison, an antimony-containing, but phosphorus-free, catalyst was similarly prepared.

The antimony-free catalyst contained 48 wt. percent nickel, 17 wt. percent tin, 4.1 wt. percent phosphorus, tography. The results of the test are shown in Table II below.

TABLE II.—OXIDATIVE DEHYDROGENATION OF BUTANE

|  | Run 5 | Run 6 | Run 7 |
|---|---|---|---|
| Catalyst | Ni/Sn/P/Sb/O | Ni/Sn/P/O | Ni/Sn/Sb/P/O |
| Ni:Sn atomic ratio | 5:1 | 5:1 | 5:1 |
| Conversion, percent | 46 | 50 | 33 |
| Yields:[1] |  |  |  |
| Butadiene | 17.1 | 26.1 | 0.7 |
| Butenes | 18.5 | 5.8 | 2.4 |
| Cracked | 4.3 | 4.0 | 11.1 |
| Carbon oxides | 6.5 | 14.3 | 19.2 |
| Modivity:[2] |  |  |  |
| To butadiene | 37 | 52 | 2 |
| To butadiene plus butenes | 77 | 64 | 9 |

[1] In moles per 100 moles butane fed into the reaction zone.
[2] Modivity is a simplified selectivity based on analysis of gas phase products for converted hydrocarbons, oxides of carbon and unconverted feed. As used herein, conversion and yield are reported on same basis as modivity. The units are moles of product per 100 moles butane converted.

The data in Table II show the effect of modifying a Ni/Sn/P/O catalyst with a minor amount of antimony. Comparing invention Run 5 with control Run 6 shows that the presence of the antimony significantly increases the yield of butenes such that the overall modivity (modified selectivity) to butadiene+butenes is significantly improved. Comparing invention Run 5 with Run 7 shows that the presence of the antimony does not obviate the presence of phosphorus in order to provide a catalyst with high activity for oxidative dehydrogenation.

EXAMPLE IV

Preparation of Ni/Sn/P/Bi/O catalyst: 120 g. of K$_2$SnO$_3$·3H$_2$O and 116.4 g. of Ni(NO$_3$)$_2$·6H$_2$O were each dissolved in separate 200 ml. portions of distilled water. These solutions were added simultaneously and dropwise to 200 ml. of stirred stilled water while maintaining a pH of 6.8–7.4. The final pH was 7.6. The resulting precipitate was washed with sufficient water to achieve the desired residual potassium content and was then treated with 18.0 g. of 85 wt. percent H$_3$PO$_4$ which was diluted to 50 cc. with distilled water.

The phosphoric acid-treated wet gel was then divided into six equal portions. One portion was given no additional chemical treatment. Another portion was treated with 9.6 cc. of an aqueous solution of bismuth nitrate which contained sufficient bismuth to provide about 1 wt. percent bismuth in the solid catalyst after drying and calcination. Each of the two portions of wet gel was dried overnight at 105° C. in a forced draft oven, then calcined at 1100° F. for three hours. The dried material was then crushed and screened to a 20–40 mesh size. The invention catalyst contained about 4.7 wt. percent phosphorus and about 1 wt. percent bismuth. The bismuth-free control catalyst was similar in composition except for the absence of bismuth. Both catalysts contained about 0.21 wt. percent potassium.

The above-prepared catalysts were tested for oxidative dehydrogenation of butane in a fixed bed reactor, heated by a furnace. The control temperature of the furnace was 1100° F. A mixture of butane, steam and air was passed through the reactor at atmospheric pressure. The butane rate was 300 GHSV. The oxygen:butane:steam ratio was 1:1:10 by volume. After three hours on-stream, the effluent was sampled and analyzed. The results of the tests are shown in Table III.

TABLE III.—OXIDATIVE DEHYDROGENATION OF BUTANE

|  | Run 8 | Run 9 |
|---|---|---|
| Catalyst | Ni/Sn/P/Bi/O | Ni/Sn/P/O |
| Ni:Sn atomic ratio | 1:1 | 1:1 |
| Conversion, percent | 34.5 | 31.2 |
| Yields:[1] |  |  |
| Butadiene | 14.7 | 13.5 |
| Butadiene plus butenes | 16.4 | 14.3 |
| Modivity:[2] To butadiene plus butenes | 48 | 46 |

[1] In moles per 100 moles butane fed into the reaction zone.
[2] Modivity is a simplified selectivity based on analysis of gas phase products for converted hydrocarbons, oxides of carbon and unconverted feed. As used herein, conversion and yield are reported on same basis as modivity. The units are moles of product per 100 moles butane converted.

The data in Table III illustrate the effects of the addition of minor amounts of bismuth to the Ni/Sn/P/O oxidative dehydrogenation catalyst. Comparing invention Run 8 with control Run 9 shows that increased amounts of butadiene and butenes were obtained.

EXAMPLE V

In a manner essentially similar to that of Example IV, three more Ni/Sn/P/Bi/O catalyst, containing varying amounts of bismuth, were prepared. One such catalyst (Run 10) was found to contain 4.0 wt. percent phosphorus, 2.3 wt. percent potassium, 0.61 wt. percent bismuth, 22 wt. percent nickel, and was found to have a surface area of 84 m.²/g. Two other invention catalysts had similar compositions except the bismuth level was 2.0 and 3.1, respectively. A similarly prepared bismuth-free catalyst was also prepared for comparison.

The above-prepared catalysts were tested for oxidative dehydrogenation of butane under conditions essentially identical to those of Example IV. The results of these tests are shown in Table IV below.

Comparing control Run 13 with invention Runs 10, 11 and 12 shows that the presence of bismuth increased the conversion and the total yields of butadiene and butenes.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A process for the dehydrogenation of hydrocarbon feedstocks containing from 2 to 12 carbon atoms and at least one

grouping which comprises contacting said feedstock in the vapor phase under dehydrogenation conditions in the presence of molecular oxygen with a calcined catalyst consisting essentially of:

from about 20 to about 75 weight percent, based on weight of catalyst, of at least one ferrous metal selected from the group consisting of nickel, cobalt or iron, in combination with from about 1 to about 50 weight percent, based on weight of catalyst, of tin, from about 0.5 to about 10 weight percent, based on weight of catalyst, of phosphorus, from about 1 to about 10 weight percent, based on weight of catalyst, of at least one metal selected from the class consisting of arsenic, antimony or bismuth, and from about 0 to about 6 weight percent, based on weight of catalyst, of at least one alkali metal; and wherein at least one of said ferrous metal, said tin, said phosphorus, said arsenic, antimony or bismuth, or said alkali metal is combined with oxygen.

2. A process according to claim 1 wherein the amount of ferrous metal is in the range of about 30 to about 50 weight percent, the amount of said tin is in the range of about 14 to about 35 weight percent, the amount of said phosphorus is in the range of about 2 to about 6 weight percent, the amount of said arsenic, antimony or bismuth is in the range of about 1 to about 5 weight percent, and the amount of said alkali metal is in the range of about 1 to about 4 weight percent.

3. A process according to claim 1 wherein said hydrocarbon feedstock comprises at least paraffinic hydrocarbon.

4. A process according to claim 3 wherein said hydrocarbon feedstock comprises butane.

5. A process according to claim 2 wherein said hydrocarbon feedstock contains from 4 to 12 carbon atoms.

TABLE IV.—OXIDATIVE DEHYDROGENATION OF BUTANE

|  | Run 10 | Run 11 | Run 12 | Run 13 |
|---|---|---|---|---|
| Catalyst | Ni/Sn/P/Bi/O | Ni/Sn/P/Bi/O | Ni/Sn/P/Bi/O | Ni/Sn/P/O |
| Ni:Sn atomic ratio | 1:1 | 1:1 | 1:1 | 1:1 |
| Percent Bi | 0.61 | 2.0 | 3.1 | 0 |
| Conversion, percent | 39.5 | 35.8 | 34.7 | 30.1 |
| Yields:[1] |  |  |  |  |
| Butadiene | 18.3 | 16.6 | 14.5 | 16.0 |
| Butadiene plus butenes | 20.8 | 20.4 | 18.5 | 17.5 |
| Modivity:[2] To butadiene plus butenes | 53 | 57 | 53 | 58 |

[1] In moles per 100 moles butane fed into the reaction zone.
[2] Modivity is a simplified selectivity based on analysis of gas phase products for converted hydrocarbons, oxides of carbon and unconverted feed. As used herein, conversion and yield are reported on same basis as modivity. The units are moles of product per 100 moles butane converted.

References Cited

UNITED STATES PATENTS 3,414,631   12/1968   Grasselli et al. _____ 260—680
3,555,105   1/1971    Nolan et al. _____ 260—680

PAUL M. COUGHLAN, Jr., Primary Examiner

U.S. Cl. X.R.

252—437; 260—683.3